Aug. 25, 1964 J. D. RALPHS 3,146,404
DIRECT CURRENT OR LOW FREQUENCY TRANSISTOR AMPLIFIERS
HAVING A HIGH INPUT IMPEDANCE
Filed March 2, 1961

Inventor
John Dennis Ralphs
By
Cushman, Darby & Cushman
Attorneys 3,146,404
Patented Aug. 25, 1964

3,146,404

DIRECT CURRENT OR LOW FREQUENCY TRANSISTOR AMPLIFIERS HAVING A HIGH INPUT IMPEDANCE

John Dennis Ralphs, Crowborough, England, assignor to National Research Development Corporation, London, England Filed Mar. 2, 1961, Ser. No. 92,826
Claims priority, application Great Britain Mar. 15, 1960
10 Claims. (Cl. 330—10)

The present invention relates to transistor amplifiers.

In former direct current or low frequency transistor amplifiers the only ways in which a high input impedance could be achieved were by either high base and collector feed resistors or an appreciable amount of direct current negative feedback. In either case the maximum input impedance which could be achieved was very limited by temperature effects. It is an object of the present invention to provide a direct current or low frequency amplifier having a high input impedance but in which temperature drift effects, instability and non-linearity are substantially absent.

According to the present invention there is provided a transistor amplifier including a first transistor, an input connected to the base electrode of the first transistor, a resistance-capacity smoothing circuit connected to the emitter electrode of the first transistor, means for impressing voltage pulses on the first transistor to urge it to conduct and amplifying and detecting means operated by the pulse current through the first transistor to charge the smoothing circuit in a sense to cut off the first transistor.

Figure 1:
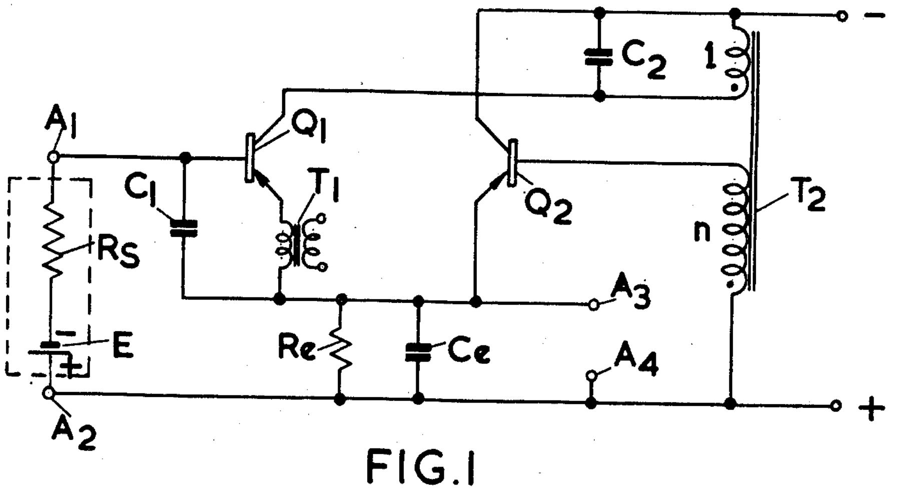
Figure 2:
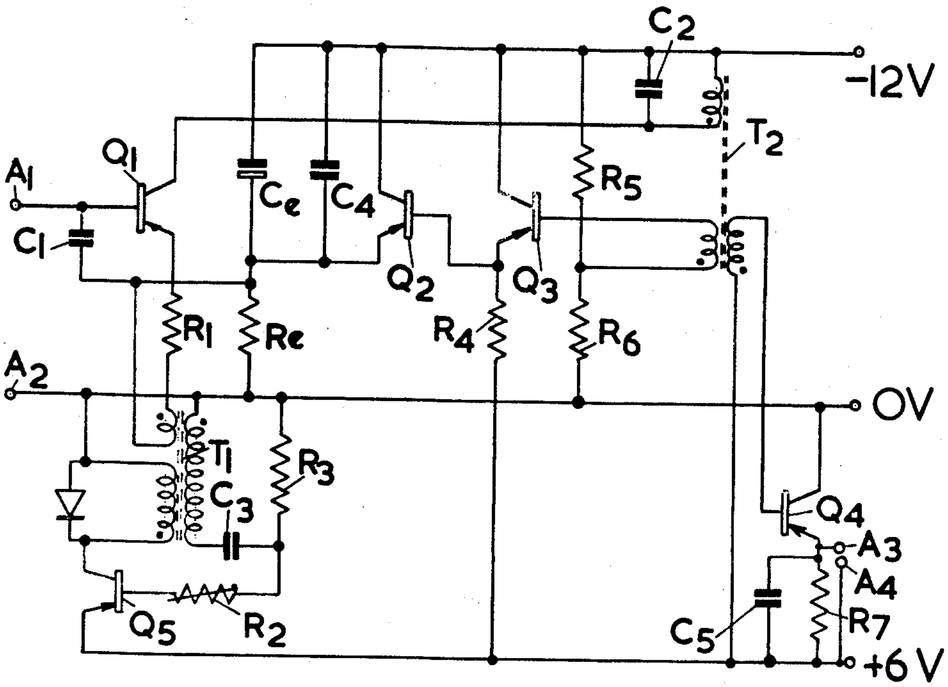

An embodiment of the invention will now be described by way of example and with reference to the accompanying drawings, in which FIGURE 1 and FIGURE 2 are both circuit diagrams of transistor amplifiers.

In FIGURE 1 a source E of a signal voltage having a source resistance $R_s$ is shown applied between terminal $A_1$ and $A_2$, the negative lead from the source being connected to the terminal $A_1$ and the positive lead from the source being connected to the terminal $A_2$. The terminal $A_1$ is connected to the base electrode of a transistor $Q_1$, whose emitter electrode is connected to an output terminal $A_3$ via the secondary winding of a transformer $T_1$ and whose collector electrode is connected to a negative voltage line via the primary winding of a transformer $T_2$. The base electrode of the transistor $Q_1$ is connected to the output terminal $A_3$ via a capacitor $C_1$. The terminal $A_2$ is connected to a positive voltage line, to which the output terminal $A_4$ is also connected. A resistor $R_e$ and a capacitor $C_e$ are connected in parallel between the terminal $A_3$ and the terminal $A_4$, thus forming a resistance-capacity smoothing circuit. A capacitor $C_2$ is connected across the primary winding of the transformer $T_2$, and a transistor $Q_2$ has its collector electrode connected to the negative voltage line, its emitter electrode connected to the output terminal $A_3$ and its base electrode connected to the positive voltage line via the secondary winding of the transformer $T_2$.

In operation the output voltage V across the terminals $A_3$ and $A_4$ follows the signal voltage E of the source E, although it is higher by a substantially constant small voltage; the output impedance, however, is much lower than the input impedance. The operation is as follows. A source of short positive pulses at a medium repetition frequency (for example, 1 volt for 5 micro-seconds at 3 kc./s.) applies these pulses between the emitter and the base of the transistor $Q_1$ via the transformer $T_1$ the capacitor $C_1$ acting as a low-impedance path to these pulses. The resulting collector current pulse is applied to the primary winding of the transformer $T_2$. The voltage output from the secondary winding of the transformer $T_2$ is applied to the base of the transistor $Q_2$ and the emitter current of the transistor $Q_2$ is drawn through the resistor $R_e$ and the capacitor $C_e$ in parallel. The pulses of emitter current are smoothed by the capacitor $C_e$ to give a substantially steady D.C. voltage across the resistor $R_e$. This resulting voltage V is applied as a bias to the emitter circuit of the transistor $Q_1$.

If the voltage V is much greater in magnitude than the voltage E, the transistor $Q_1$ will be cut off, no waveform will appear across the primary winding of the transformer $T_2$ and the transistor $Q_2$ will therefore be cut off also. Thus the voltage V will decay towards zero with a time constant $R_eC_e$. As the voltage V approaches the voltage E the positive peak of the emitter pulse will cause the transistor $Q_1$ to conduct, causing a much larger positive voltage pulse on the collector of the transistor $Q_1$ and a corresponding negative voltage pulse on the base of the transistor $Q_2$. If this pulse is smaller in amplitude than the voltage V then the transistor $Q_2$ will not conduct, and, the emitter current pulses of the transistor $Q_1$ being relatively small the voltage V will continue to decay. The current pulses through the transistor $Q_1$ will increase until the transistor $Q_2$ conducts on the peaks of the pulses. The pulses in the emitter circuit of the transistor $Q_2$ will then tend to recharge the capacitor $C_e$ and a stable state will be reached when the peak amplitude in the base circuit of the transistor $Q_2$ is such that the pulses in its emitter circuit just restore the charge lost on the capacitor $C_e$ between pulses.

The above operation of the circuit ignores the action of the capacitor $C_2$ which causes the transformer $T_2$ to operate as a high-Q tuned circuit. The waveform in this case at the collector of the transistor $Q_1$ is a damped sinusoidal or ringing waveform, whereby the need for D.C. restoration at the base of the transistor $Q_2$ is eliminated and, since the transistor $Q_2$ may conduct on two or three successive peaks of the waveform, the peak emitter current required is reduced.

Since the peak voltage of the voltage waveform on the base electrode of the transistor $Q_2$ is equal to V, this waveform may be separately amplified and detected with a peak detector, enabling direct current amplification to be achieved with a change of reference voltage or the polarity changed, or both, and thus with the elimination of the constant input to output voltage difference mentioned above.

The preferred mark-space ratio of the positive pulses applied to the emitter electrode of the transistor $Q_1$, that is to say, the preferred ratio between the pulse width and the time elapsed between the pulses is the ratio between the maximum signal input current of the amplifier and the peak allowable emitter electrode current for the transistor $Q_2$ divided by the total A.C. gain between the two electrodes. Instead of positive pulses applied to the emitter electrode of the transistor $Q_1$, negative pulses may be applied to its base electrode: these have the same effect on the collector electrode current.

FIGURE 2 is a further circuit diagram of a modified form of the transistor amplifier shown in FIGURE 1. Components in FIGURE 2 having a similar function as components in FIGURE 1 are marked with the same reference.

FIGURE 2 shows two input terminals $A_1$ and $A_2$, the terminal $A_1$ being connected to the base of a transistor $Q_1$. The collector of the transistor $Q_1$ is connected to a primary winding of a transformer $T_2$ across which a capacitor $C_2$ is connected. The output from a secondary winding of the transformer $T_2$ is applied to an emitter follower transistor $Q_3$, the emitter of which is connected to the base of a transistor $Q_2$. The emitter of the transistor $Q_2$ is connected to a smoothing circuit $R_e$, $C_e$, $C_4$ and to the emitter of the transistor $Q_1$ through a secondary winding of a transformer $T_1$ and a stopper resistor $R_1$. The secondary winding of the transformer $T_1$ is connected between the base and emitter of the transistor $Q_1$ via a capacitor $C_1$ and the resistor $R_1$. In the case of the circuit of FIGURE 2, the pulses applied between the emitter and base of the transistor $Q_1$ are derived from a conventional free-running blocking oscillator comprising a transistor $Q_5$, resistors $R_2$ and $R_3$, a capacitor $C_3$ and primary and tertiary windings of the transformer $T_1$, as shown in the drawing. This blocking oscillator has a pulse recurrence frequency of 3 kc./s. and provides pulses of approximately 4 to 5 microseconds wide, the actual width being adjustable by the resistor $R_2$ to obtain optimum operation of the circuit. This optimum occurs when the pulse width is equal to the half period of oscillation of the tuned circuit formed by the primary winding of the transformer $T_2$ and the capacitor $C_2$. Alternatively, the pulse width may be fixed and the value of the capacitor $C_2$ or the inductance of the primary winding of the transformer $T_2$ adjusted to achieve the same optimum operation of the circuit.

The output of the amplifier shown in FIGURE 2 is derived from a tertiary winding of the transformer $T_2$ through a transistor peak detector circuit comprising a transistor $Q_4$ and a smoothing circuit $C_5$, $R_7$. The base of the transistor $Q_4$ is connected to the tertiary winding of the transformer $T_2$ and its emitter is connected to the smoothing circuit $C_5$, $R_7$. An output is taken from the transistor peak detector from across the smoothing circuit $C_5$, $R_7$ via output terminals $A_3$ and $A_4$.

The operation of the circuit shown in FIGURE 2 is similar to that shown in FIGURE 1. The emitter follower transistor $Q_3$ is, in this case, inserted between the secondary winding of the transformer $T_2$ and the base of the transistor $Q_2$ to provide increased current gain.

The action of the peak detector transistor $Q_4$ may be seen from the following description. The transistor $Q_2$ is a form of emitter follower with the exception that it has a long time-constant $R_e$, $C_e$, $C_4$ in its emitter circuit. It follows that the peak voltage on its base is substantially equal to the voltage on its emitter. Also from the description given in relation to FIGURE 1, the voltage on the emitter of the transistor $Q_2$ will be seen to be very nearly equal to the input voltage across the input terminals $A_1$ and $A_2$. Therefore, the peak voltage on the base of the transistor $Q_2$ is very nearly equal to the input voltage. The transistor $Q_3$ is also an emitter follower and the peak voltage on its base will be very nearly equal to the peak voltage on its emitter, which is connected to the base of the transistor $Q_1$. Therefore, the peak voltage on the base of the transistor $Q_3$ will be very nearly equal to the input voltage. The voltage on the base of the transistor $Q_3$ will be stepped up by the turns ratio between the tertiary and secondary windings of the transformer $T_2$ and applied to the peak detector transistor $Q_4$. It necessarily follows that the output of the peak detector transistor $Q_4$ is proportional to the input voltage.

The circuit shown in FIGURE 2 may be such that the amplifier has an overall voltage gain of 1.5 and has a low impedance output, this output being transposed to the +6 volt line shown in the drawing. The input impedance is greater than 15 megohms and the maximum output is approximately six volts.

For optimum efficiency the ringing frequency of the transformer $T_2$ should be such that a half period is equal to the input pulse width. This is achieved by varying the pulse width by means of a variable (preset) resistance $R_2$ in series with the base electrode of the transistor $Q_5$. Otherwise the operation of the circuit is the same as that of the circuit in FIGURE 1.

The preferred component values of the circuit described with reference to FIGURE 2 are as follows:

| | | |
|---|---|---|
| Transistor $Q_1$ | | OC202 |
| Transistor $Q_2$ | | TK40A |
| Transistor $Q_3$ | | TK40A |
| Transistor $Q_4$ | | TK40A |
| Transistor $Q_5$ | | TK40A |
| Resistor $R_e$ | | 3.3KΩ |
| Resistor $R_1$ | | 100Ω |
| Resistor $R_2$ | | 1KΩ |
| Resistor $R_3$ | | 470KΩ |
| Resistor $R_4$ | | 10KΩ |
| Resistor $R_5$ | | 4.7KΩ |
| Resistor $R_6$ | | 390Ω |
| Resistor $R_7$ | | 47KΩ |
| Capacitor $C_e$ | μF | 4 |
| Capacitor $C_1$ | μF | 0.1 |
| Capacitor $C_2$ | pF | 500 |
| Capacitor $C_3$ | pF | 2000 |
| Capacitor $C_4$ | μF | 0.01 |
| Capacitor $C_5$ | μF | 0.1 |

The resistor $R_6$ may be adjusted if necessary to give optimum linearity at low signal voltages.

The effective capacitative load on the emitter of the transistor $Q_3$ may cause the input impedance across its base to contain a negative resistance so that the circuit oscillates; this may be overcome by deliberately damping the transformer $T_2$.

Those skilled in the art will realize that the invention has many possible applications, for example, with a condenser input coupling and a base bias applied to the transistor $Q_1$ through a high resistance the circuit may be used as a low frequency amplifier; the high input impedance and the facility of transposing the output make it a possible replacement for a thermionic valve cathode follower following piezo-electric pressure transducers and similar devices; and the facility of reversing the polarity of the output or producing outputs of both polarities may be used in, for example, analogue computers.

I claim:

1. A transistor amplifier including a first transistor, a resistance-capacitance smoothing circuit connected to the emitter of said first transistor, means for connecting an input voltage between the base of the transistor and to the side of said smoothing circuit remote from the emitter, means for applying voltage pulses between the base and emitter of said first transistor in a sense tending to increase the conduction thereof, and amplifying and detecting means connected between the collector of the said transistor and the said smoothing means so as to be operated by the pulse current through the said transistor to charge the smoothing circuit in a sense tending to reduce the conduction through the said transistor.

2. A transistor amplifier as set forth in claim 1 wherein said means for applying voltage pulses between the base and the emitter of said first transistor includes the secondary winding of a transformer, the said secondary winding being connected between the said emitter and the said smoothing circuit.

3. A transistor amplifier as set forth in claim 2 further comprising a free-running blocking oscillator the output of which is connected to the primary winding of the said transformer.

4. A transistor amplifier as set forth in claim 1 wherein the amplifying and detecting means includes a transformer the primary winding of which is connected to the collector of the said first transistor, and a second transistor having its base connected to the secondary winding of the said transformer and its emitter connected to the said smoothing circuit.

5. A transistor amplifier as set forth in claim 4 wherein a capacitor is connected across the primary winding of the said transformer to form a tuned circuit therewith.

6. A transistor amplifier as set forth in claim 1 wherein the amplifying and detecting means includes a transformer the primary winding of which is connected to the collector of the said first transistor, a second transistor having its base connected to the secondary winding of the said transformer and a third transistor having its base connected to the emitter of the said second transistor and its emitter connected to the said smoothing circuit.

7. A transistor amplifier as set forth in claim 6 further comprising a tertiary winding on the said transformer and a transistor peak voltage detector connected to the output of the said tertiary winding.

8. A transistor amplifier including (*a*) a first transistor,
(*b*) a smoothing circuit,
(*c*) a first transformer having its secondary winding connected between the emitter of the first transistor and the smoothing circuit,
(*d*) means for applying an input signal between the base of the said first transistor and the side of the smoothing circuit remote from the said secondary winding,
(*e*) a second transistor having its emitter connected to the junction of the said secondary winding and the said smoothing circuit,
(*f*) a capacitor connecting the said junction to the base of the first transistor and
(*g*) a second transformer having its primary winding connected to the collector of the said first transistor and its secondary winding connected to the base of the said second transistor.

9. A transistor amplifier including (*a*) a first transistor,
(*b*) a smoothing circuit,
(*c*) a first transformer having its secondary winding connected between the emitter of the first transistor and the smoothing circuit,
(*d*) means for applying an input signal between the base of the first transistor and the side of the smoothing circuit remote from the said secondary winding,
(*e*) a second transistor having its emitter connected to the junction of the said secondary winding and the said smoothing circuit,
(*f*) a capacitor connecting the said junction to the base of the said first transistor,
(*g*) a third transistor having its emitter connected to the base of the said second transistor and
(*h*) a second transformer having its primary winding connected to the collector of the said first transistor and its secondary winding connected to the base of the said third transistor.

10. A transistor amplifier as set forth in claim 9 further comprising a tertiary winding on the said second transformer and a transistor peak voltage detector connected to the output of the said tertiary winding.

References Cited in the file of this patent

UNITED STATES PATENTS

| | | |
|---|---|---|
| 2,997,656 | Barlow | Aug. 22, 1961 |
| 3,003,122 | Gernard | Oct. 3, 1961 |
| 3,019,396 | Heine et al. | Jan. 30, 1962 |